(12) United States Patent
Minhas et al.

(10) Patent No.: US 8,317,902 B2
(45) Date of Patent: Nov. 27, 2012

(54) PROCESS FOR REMOVING POLAR COMPONENTS FROM A PROCESS STREAM TO PREVENT HEAT LOSS

(75) Inventors: Bhupender S Minhas, Bridgewater, NJ (US); Frederick Y. Lo, Middlesex, NJ (US); Ian A Cody, Adelaide (AU); Donald E Stratton, Kingwood, TX (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 499 days.

(21) Appl. No.: 12/537,277

(22) Filed: Aug. 7, 2009

(65) Prior Publication Data

US 2010/0037773 A1 Feb. 18, 2010

Related U.S. Application Data

(60) Provisional application No. 61/136,174, filed on Aug. 15, 2008.

(51) Int. Cl.
*B01D 53/02* (2006.01)

(52) U.S. Cl. ........... 95/114; 95/117; 95/128; 95/135; 95/136; 95/148

(58) Field of Classification Search .......... 95/114, 95/128, 135, 136, 148; 96/126
See application file for complete search history.

(56) References Cited

U.S. PATENT DOCUMENTS

| | | | |
|---|---|---|---|
| 3,063,933 A * | 11/1962 | Meiners | 208/89 |
| 4,313,821 A | 2/1982 | Garwood et al. | |
| 4,533,529 A * | 8/1985 | Lee | 423/230 |
| 4,795,545 A | 1/1989 | Schmidt | |
| 4,831,206 A * | 5/1989 | Zarchy | 585/737 |
| 5,292,987 A * | 3/1994 | Zarchy et al. | 585/738 |
| 5,300,218 A | 4/1994 | Graiff et al. | |
| 6,107,535 A * | 8/2000 | Rossini et al. | 585/823 |
| 6,248,230 B1 | 6/2001 | Min et al. | |
| 6,787,025 B2 * | 9/2004 | Mukherjee et al. | 208/89 |
| 7,128,829 B1 | 10/2006 | Kulprathipanja et al. | |

(Continued)

FOREIGN PATENT DOCUMENTS

EP 0335034 A1 10/1989

(Continued)

OTHER PUBLICATIONS

PCT International Search Report, Form PCT/ISA/210, 5pgs.
PCT Written Opinion of the International Searching Authority, Form PCT/ISA/237, 6pgs.

*Primary Examiner* — Duane Smith
*Assistant Examiner* — Christopher P Jones
(74) *Attorney, Agent, or Firm* — Glenn T. Barrett

(57) ABSTRACT

A process for removing polar components from a process stream in a refinery process without cooling the process stream. The process stream is fed to a first adsorber unit to remove contaminants containing sulfur at substantially the same elevated temperature by exposing the process stream to a metal oxide and/or a mixed metal oxide to remove the sulfur containing contaminants and produce a metal sulfide and a desulfurized process stream. The metal sulfide may be regenerated by exposing it to a stream of oxygen and the desulfurized process stream exposed to the regenerated metal/mixed metal oxide to remove moisture from the stream. The stream is then processed within a second adsorber unit to remove nitrogen containing contaminants at substantially the same elevated temperature by exposing the stream to a molecular sieve and/or zeolite.

5 Claims, 3 Drawing Sheets

U.S. PATENT DOCUMENTS

| | | | |
|---|---|---|---|
| 2004/0108250 A1* | 6/2004 | Murphy et al. | 208/89 |
| 2004/0118748 A1 | 6/2004 | Lesemann et al. | |
| 2004/0118749 A1 | 6/2004 | Lesemann et al. | |
| 2005/0098479 A1 | 5/2005 | Jacobs et al. | |
| 2005/0263441 A1 | 12/2005 | Antonio et al. | |
| 2006/0211906 A1 | 9/2006 | Berezutskiy | |
| 2006/0252632 A1* | 11/2006 | Cody et al. | 502/64 |
| 2006/0252972 A1 | 11/2006 | Pilliod et al. | |
| 2007/0068850 A1* | 3/2007 | Cody et al. | 208/28 |

FOREIGN PATENT DOCUMENTS

| | | |
|---|---|---|
| WO | 0208160 A1 | 1/2002 |
| WO | 2004035712 A1 | 4/2004 |
| WO | 2007018677 A1 | 2/2007 |

* cited by examiner

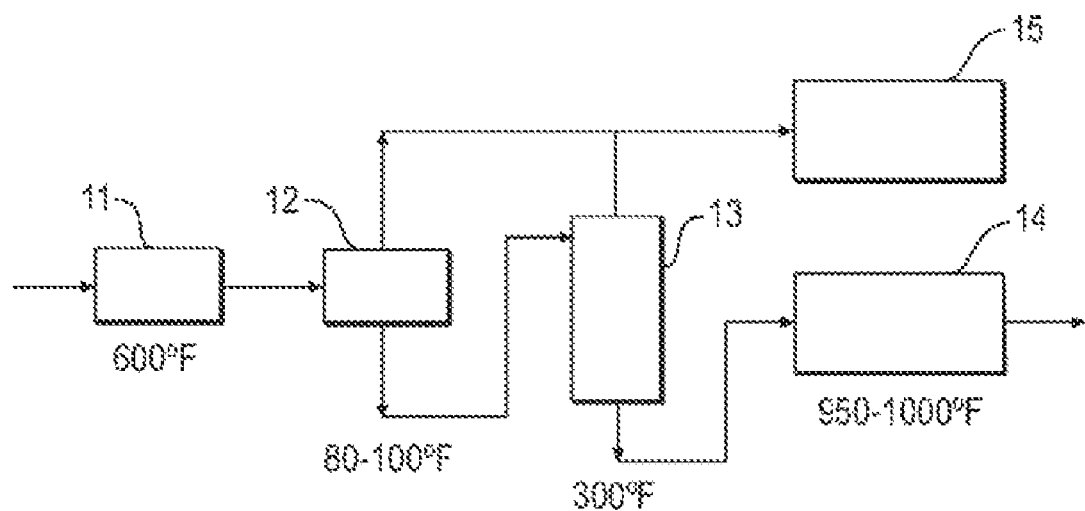
FIG. 1 - PRIOR ART
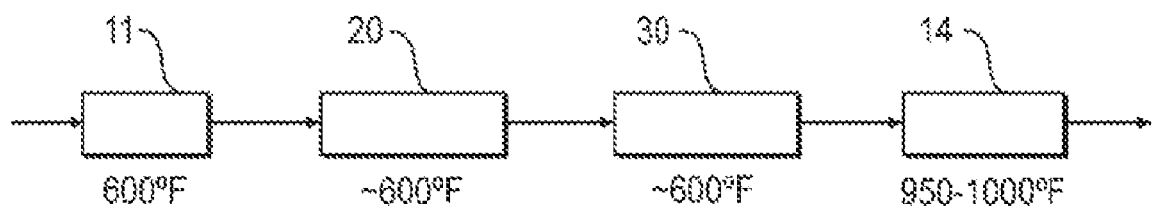
FIG. 2

PROCESS FOR REMOVING POLAR COMPONENTS FROM A PROCESS STREAM TO PREVENT HEAT LOSS

CROSS REFERENCE TO RELATED APPLICATIONS

This application relates to and claims priority to US Provisional Patent Application No. 61/136,174, filed on Aug. 15, 2008.

FIELD OF THE INVENTION

The present invention relates to the removal of polar components from a refinery process stream. In particular, the present invention relates to the removal of polar components from a refinery process stream, which does not require the cooling of the process stream in order to remove the components. The present invention relates to a process for the removal of $H_2S$ and $NH_3$ from process streams.

BACKGROUND OF THE INVENTION

Many hot process streams in refineries are cooled to remove polar contaminants such as $H_2S$ and $NH_3$. Removal of these contaminants is important as downstream processes are typically both sulfur (S) and nitrogen (N) sensitive. The current processes for S and N removal are low temperature processes. Currently, there are no high temperature commercial processes for separating polar contaminants (such as $H_2S$ and $NH_3$) available. $H_2S$ is usually removed by an absorption process using amines, methanol, etc. $NH_3$ is usually removed from the process stream with a water wash. After the removal of the contaminants and before further processing, the process streams must be reheated to elevated temperatures. This cooling and subsequent reheating of process streams, however, results in a significant heat loss and increases the amount of energy required for processing the streams.

FIG. 1 illustrates a current process for removing contaminants such as $H_2S$ and $NH_3$ from a process stream. The hydrocarbon stream passes from a hydrotreater 11 at a temperature of approximately 600° F. Before the stream can be processed in a reformer 14, the stream is cooled in one or more heat exchangers. The stream is cooled from 600° F. to 80° F.-100° F. In flash drum or vessel 12, a portion of $H_2S$, $NH_3$ and other lighter components are removed from the remaining heavier components in the process stream. The process stream is then fed to a stripper 13 to substantially remove the remaining portion of $H_2S$ and $NH_3$ such that the appropriate levels remain in the process stream (e.g., less than 2 PPM level) before the process stream can pass to the reformer 14. The contaminants removed in the flash vessel 12 and the stripper 13 can then be fed to other processing equipment 15 for further processing. The process stream that is free of contaminants ($H_2S$ and $NH_3$) is then reheated to a temperature of 950-1000° F. for processing in reformer 14. This prior art process is inefficient because the process stream must be cooled and subsequently reheated. This results in a significant heat loss even with heat integration, where the withdrawn heat is used to heat other process streams.

There is a need for a process to remove S and N contaminants at elevated temperatures that does not require the significant cooling of the process stream such that heat loss can be prevented and the overall process can be made more energy efficient.

SUMMARY OF THE INVENTION

It is an aspect of the present invention to provide a method for removing polar components from a process stream in a refinery process. The process stream is processed within the refinery at an elevated temperature. In accordance with the present invention, the process stream is fed to a first adsorber unit to remove contaminants containing sulfur from the process stream. The process stream is processed within the first adsorber unit to remove sulfur containing contaminants. The sulfur containing contaminants may include $H_2S$. The process stream is processed in the first adsorber unit at substantially the same elevated temperature as the process stream exiting the hydrotreater. The process stream is processed within the first adsorber unit by exposing the process stream to at least one of a metal oxide and a mixed metal oxide to remove the sulfur containing contaminants from the process stream and produce a metal sulfide, a desulfurized process stream and water. The metal sulfide may be exposed to a stream of oxygen to regenerate at least one of a metal oxide and a mixed metal oxide. The desulfurized process stream and water may be exposed to at least one of the regenerated metal oxide and regenerated mixed metal oxide to remove moisture from the desulfurized process stream. The desulfurized process stream is then fed through a second adsorber unit to remove contaminants containing nitrogen from the process stream. The nitrogen containing contaminants may include $NH_3$. The process stream is processed within the second adsorber unit to remove nitrogen containing contaminants, where the process stream is processed at substantially the same elevated temperature as the stream exiting the hydrotreater. The process stream is processed within the second adsorber unit by exposing the process stream to at least one of a molecular sieve and zeolites to remove nitrogen containing contaminants from the process stream.

It is another aspect of the present invention to provide a system for removing polar components from a high temperature process stream having an elevated process temperature in a refinery. The system includes a first adsorber unit to remove contaminants containing sulfur from the high temperature process stream. The first adsorber unit removes the sulfur containing contaminants at temperature substantially the same as the elevated process temperature. The first adsorber unit containing at least one of a metal oxide and a mixed metal oxide, wherein the process stream being exposed to the at least one of a metal oxide and a mixed metal oxide to remove the sulfur containing contaminants from the process stream and produce a metal sulfide and a desulfurized process stream. The system also includes a second adsorber unit to remove contaminants containing nitrogen from the high temperature process stream. The second adsorber unit removes the nitrogen containing contaminants at temperature substantially the same as the elevated process temperature. The second adsorber unit containing at least one of a molecular sieve and zeolites to remove nitrogen containing contaminants from the process stream.

BRIEF DESCRIPTION OF THE DRAWINGS

The invention will now be described in conjunction with the accompanying drawings in which like reference numerals describe like elements and wherein:

FIG. 1 is a flow diagram illustrating a conventional process for the removing contaminants such as $H_2S$ and $NH_3$ from a process stream;

FIG. 2 is a flow diagram illustrating a process for the removing contaminants from a process stream in accordance with an embodiment of the present invention;

DETAILED DESCRIPTION OF PREFERRED EMBODIMENTS

Figure 3:
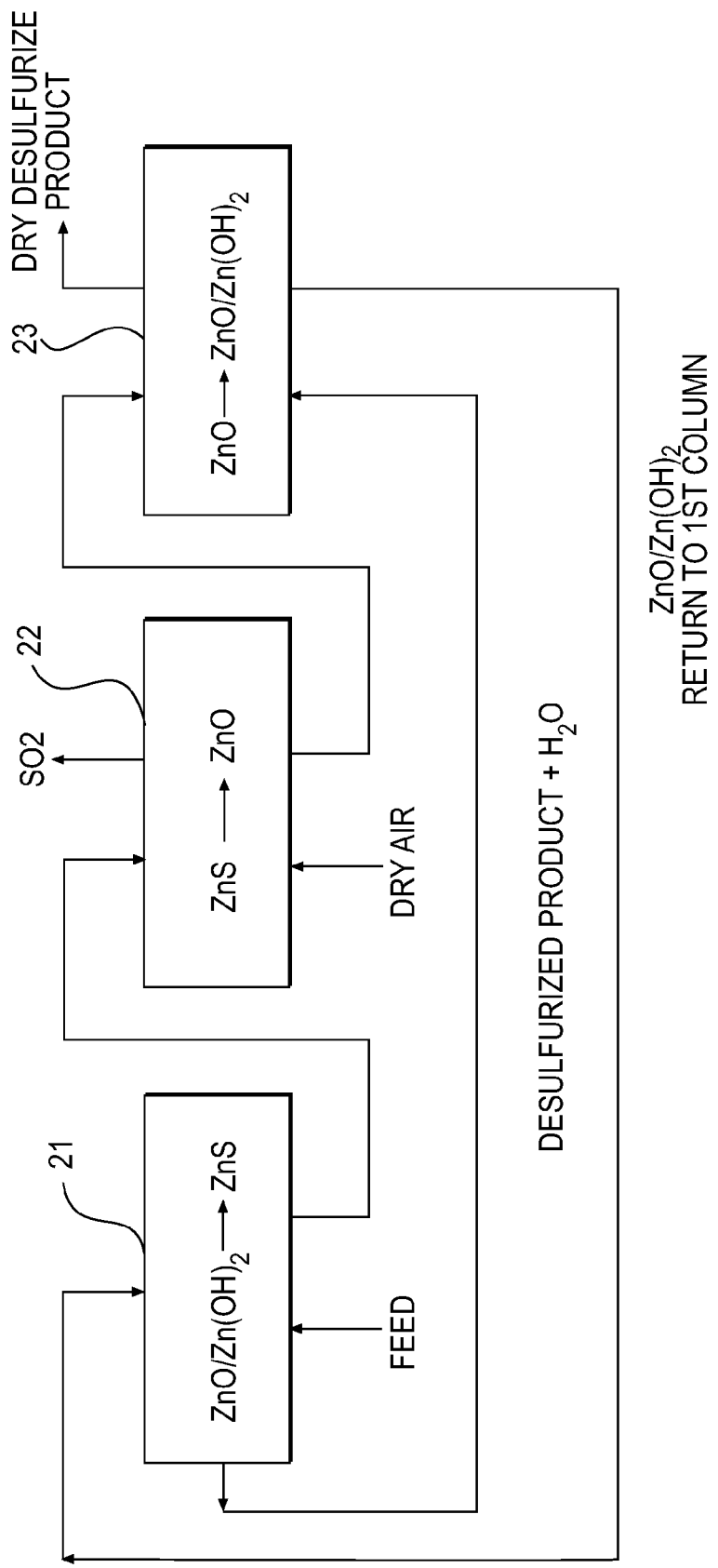
FIG. 3 is a detailed flow diagram of the process for removing sulfur containing contaminants from the process stream in accordance with an embodiment of the present invention.

The present invention will now be described in greater detail in connection with the figures. The process according to an aspect of the present invention is illustrated in FIG. 2. The hydrocarbon stream passes through a hydrotreater 11 at a temperature of approximately 600° F. Following the hydrotreater 11, the process stream can proceed through a sulfur adsorber unit 20 to remove sulfur containing contaminants (e.g., $H_2S$) and a nitrogen adsorber unit 30 to remove nitrogen containing contaminants (e.g., $NH_3$). Unlike conventional processes, the process stream can be processed through the absorber unit 20 and unit adsorber 30 without cooling. The process stream, which is substantially free of contaminants can then be fed to the reformer 14 where the process stream is further processed at an elevated temperature 950° F.-1000° F. The present invention provides a significant advantage over conventional processes because it is more energy efficient because there is no need to cool the process stream.

The process for the removal of sulfur containing contaminants and water will now be described in greater detail in connection with FIG. 2. The process stream is fed through an S adsorber unit 20 containing a metal oxide adsorber and/or a mixed metal oxide adsorber. The S adsorber unit 20 preferably removes $H_2S$ from the process stream. In accordance with the present invention, the metal oxide adsorber for adsorbing $H_2S$ may be an oxide of Zn, Fe, Cu, Mn, Mo, Co and/or V. The present invention is not intended to be limited to solely to these metal oxides; rather, other oxides are considered to within the scope of the present invention provided such oxides function to adsorb $H_2S$. In accordance with the present invention, the mixed metal oxide adsorber for adsorbing $H_2S$ may be a zinc ferrite (i.e., a combination of ZnO and $Fe_2O_3$), a zinc titanite (i.e., a combination of ZnO and $TiO_2$) or a combination of zinc ferrites and $TiO_2$. The present invention is not intended to be limited to solely to these mixed metal oxides; rather, other mixed metal oxides are considered to within the scope of the present invention provided such oxides function to adsorb $H_2S$. The metal oxides and mixed metal oxides described herein can be located on a mixed matrix or a carrier material such as $Al_2O_3$ within the sulfur adsorber unit 20.

The following chemical reactions take place within the adsorber unit 20 summarizing $H_2S$ removal using metal oxides or mixed metal oxides are summarized below:

Sulfidation: $MO+H_2S \rightarrow MS+H_2O$
Regeneration: $MS+O_2 \rightarrow MO+SO_2$
Where M represents a metal.

The process performed by the adsorber unit 20 is illustrated in greater detail in FIG. 3. This process controls both $H_2S$ and moisture in the process stream. In FIG. 3, a zinc based adsorbent is provided to illustrate the process, but the present invention is not intended to be limited solely to the use of zinc. The process stream is fed from the hydrotreater 11 to the sulfur adsorber unit 20 at substantially the same temperature as the temperature of process stream as it exits the hydrotreater 11. The process stream or feed is exposed to the metal oxide or mixed metal oxide (e.g., ZnO as illustrated in FIG. 3) at 21 where the $H_2S$ is converted to a metal sulfide (e.g., ZnS as illustrated in FIG. 3) and water. In this sulfidation reaction, one of the reaction products is $H_2O$. The desulfurized product and water are removed from the stream and fed to metal oxide at 23, discussed below. There is a limit on moisture concentration in the process stream that may be fed to the reformer 14 because higher moisture concentrations are detrimental to reforming process. Accordingly, it is desirable to remove the $H_2O$ from the process stream.

As shown in FIG. 3, the metal sulfide is exposed to dry air at 22 to convert the metal sulfide to a metal oxide (e.g., ZnS→ZnO) and sulfur dioxide. The presence of oxygen regenerates the metal oxide so that it can be reused for subsequent sulfur removal. The sulfur dioxide $SO_2$ may then be fed to a Claus plant to complete the removal of the sulfur. The metal oxide is then exposed to the stream containing the desulfurized product and water at 23 to remove moisture from the process stream whereby the ZnO is converted to a mixture of ZnO and $Zn(OH)_2$, which may then be reused to remove sulfur from the process stream by returning the mixture for use at 21. Sufficient moisture is removed from the process stream so as to not adversely impact the reforming reaction performed by the reformer 14. The entire process performed in the adsorber 20 can be performed at a temperature that is substantially the same as the temperature of the process stream leaving the hydrotreater 11. The process illustrated in FIG. 3 for adsorber 20 utilizes a moving bed cycle of sulfidation, regeneration and rehydration of zinc adsorbent. The present invention, however, is not intended to be limited to a moving bed arrangement; rather, it is contemplated the process can be performed using a fixed bed.

Figure 4:
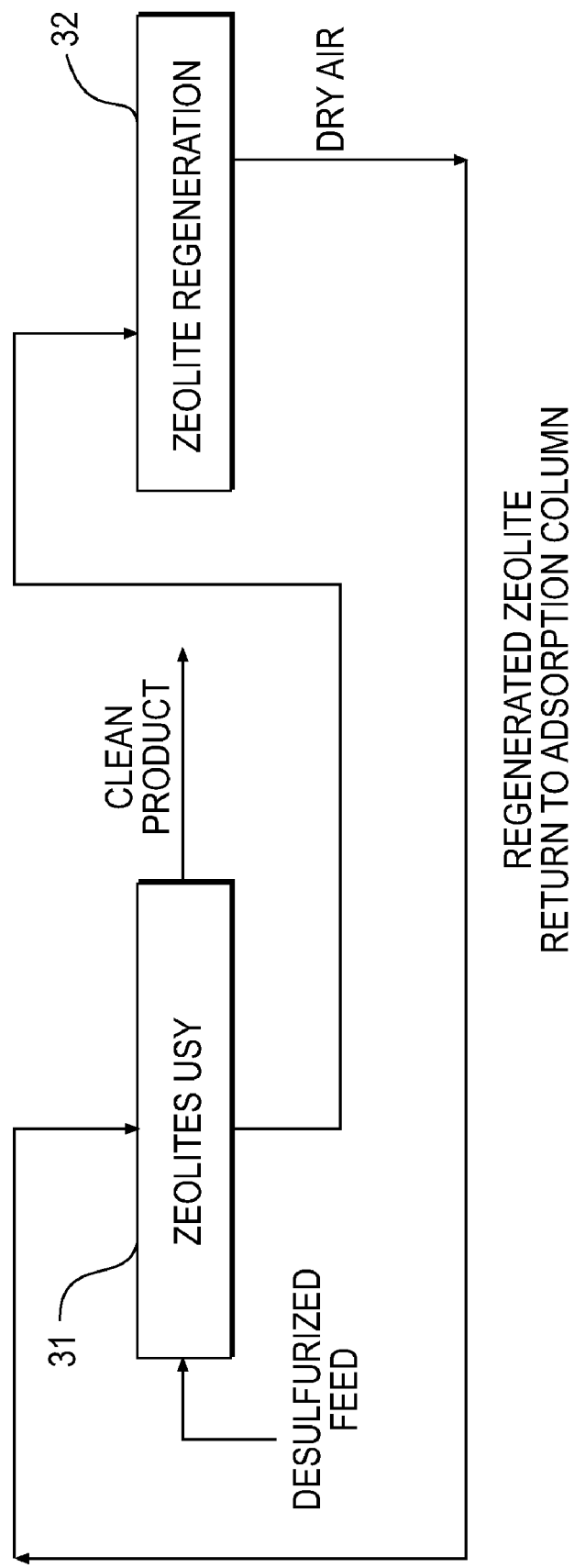
FIG. 4 is a detailed flow diagram of the process for removing nitrogen containing contaminants from the process stream in accordance with an embodiment of the present invention.

The dry process stream, which substantially free of sulfur contaminants may then be processed to remove nitrogen containing contaminants. In accordance with the present invention, the desulfurized process stream is fed to a nitrogen adsorber 30 for further processing. The temperature of the process stream as it enters the adsorber 30 is substantially the same as the temperature of the process stream leaving the hydrotreater 11 (i.e., 600° C.). The process performed by the adsorber unit 30 will now be described in greater detail in connection with FIG. 4.

The desulfurized process stream is passed through molecular sieves or zeolites at 31 to remove nitrogen contaminants (i.e., $NH_3$) from process stream. The ammonium free process stream may then be fed to the reformer 14 for further processing of the process stream. The zeolite may then be exposed to dry air at 32 for purposes of regenerating the zeolite so that it may be reused to remove additional nitrogen containing contaminants from the process stream. The removal of the nitrogen containing contaminants is accomplished at high temperature (i.e., roughly the same temperature of the process stream as it exits the hydrotreater 11).

In accordance with the present invention, the removal of sulfur and nitrogen containing contaminants can be accomplished without the need of cooling and then reheating the process stream. It will be apparent to those skilled in the art that various modifications and/or variations may be made without departing from the scope of the present invention. Thus, it is intended that the present invention covers the modifications and variations of the apparatus and methods herein, provided they come within the scope of the appended claims and their equivalents.

What is claimed is:

1. A method for removing polar components from a process stream in a refinery process, comprising:
processing a process stream at an elevated temperature;
feeding the process stream to a first adsorber unit and processing the process stream in the first adsorber unit to remove contaminants containing sulfur from the process stream by exposing the process stream at substantially the same elevated temperature to at least one of a metal oxide and a mixed metal oxide to produce a metal sulfide and a desulfurized process stream, exposing the metal sulfide in the first adsorber unit to a stream of oxygen to regenerate the at least one of a metal oxide and a mixed metal oxide;

exposing the desulfurized process stream to the at least one regenerated metal oxide and regenerated mixed metal oxide in the first adsorber unit to remove moisture from the desulfurized process stream;

feeding the process stream to a second adsorber unit and processing the process stream in the second adsorber unit at substantially the same elevated temperature to remove contaminants containing nitrogen from the process stream.

2. The method according to claim 1, wherein processing the process stream within the second adsorber unit comprises:
exposing the process stream to at least one of a molecular sieve or a zeolite to remove nitrogen containing contaminants from the process stream.

3. The method according to claim 2, wherein processing the process stream within the second adsorber unit comprises regenerating the at least one of the molecular sieve or zeolite.

4. The method according to claim 1, wherein the sulfur containing contaminants include $H_2S$.

5. The method according to claim 1, wherein the nitrogen containing contaminants include $NH_3$.

* * * * *